United States Patent
Benoni

(10) Patent No.: US 11,291,057 B2
(45) Date of Patent: Mar. 29, 2022

(54) METHOD AND SYSTEM FOR WIRELESS COMMUNICATION, IN PARTICULAR VIA BLUETOOTH® PROTOCOL, BETWEEN A MAIN COMMUNICATION DEVICE AND ONE OR MORE PERIPHERAL COMMUNICATION DEVICES

(71) Applicant: INTEREL PTE LTD, Singapore (SG)

(72) Inventor: Andrea Benoni, Singapore (SG)

(73) Assignee: INTEREL PTE LTD, Singapore (SG)

( * ) Notice: Subject to any disclaimer, the term of this patent is extended or adjusted under 35 U.S.C. 154(b) by 0 days.

(21) Appl. No.: 16/829,404

(22) Filed: Mar. 25, 2020

(65) Prior Publication Data
US 2021/0022192 A1 Jan. 21, 2021

(30) Foreign Application Priority Data
Mar. 26, 2019 (IT) ........................ 102019000004365

(51) Int. Cl.
| | | |
|---|---|---|
| *H04B 7/00* | (2006.01) | |
| *H04W 76/10* | (2018.01) | |
| *H04W 4/80* | (2018.01) | |
| *H04W 12/037* | (2021.01) | |
| *H04L 9/32* | (2006.01) | |

(52) U.S. Cl.
CPC ............ *H04W 76/10* (2018.02); *H04L 9/32* (2013.01); *H04W 4/80* (2018.02); *H04W 12/037* (2021.01)

(58) Field of Classification Search
CPC ....... H04W 4/80; H04W 76/10; H04W 12/06; H04W 88/02; H04W 12/0017; H04W 64/00; H04W 12/037; H04W 9/32
See application file for complete search history.

(56) References Cited

U.S. PATENT DOCUMENTS

| | | | | |
|---|---|---|---|---|
| 8,228,818 B2* | 7/2012 | Chase | .................. | H04L 41/0681 370/253 |
| 9,402,220 B2* | 7/2016 | Shintani | ............ | H04M 1/72412 |
| 10,469,566 B2* | 11/2019 | Hong | .................. | H04N 21/4508 |
| 10,827,334 B2* | 11/2020 | Jung | ..................... | H04W 76/23 |

(Continued)

FOREIGN PATENT DOCUMENTS

| | | |
|---|---|---|
| EP | 3101874 | 12/2016 |
| WO | 2018118822 | 6/2018 |

OTHER PUBLICATIONS

Anonymous; "Bluetooth Specification version 4.2"; Bluetooth SIG; Dec. 2, 2014; XP055359393; Retrieved from the Internet on Mar. 28, 2017; URL:https://www.bluetooth.com/specifications/adopted-specifications; Part A and Part B; 87 pages.

*Primary Examiner* — Nhan T Le
(74) *Attorney, Agent, or Firm* — Workman Nydegger

(57) ABSTRACT

A wireless communication method, in particular via Bluetooth® protocol, between a main communication device and one or more peripheral communication devices, comprising an initial step which envisages establishing a connection between the main device and the peripheral device; said initial step comprising a step of sending a connection request signal from the peripheral device to the main device which comprises a sub-step of inserting, in said connection request signal, additional data representing a first action to be performed and/or values and/or current status by the main communication device.

21 Claims, 5 Drawing Sheets

(56) References Cited

U.S. PATENT DOCUMENTS

2016/0226956 A1\* 8/2016 Hong ............... H04N 21/44218
2017/0223579 A1  8/2017 Lee et al.
2020/0137542 A1\* 4/2020 Jung ....................... H04W 4/80

\* cited by examiner

METHOD AND SYSTEM FOR WIRELESS COMMUNICATION, IN PARTICULAR VIA BLUETOOTH® PROTOCOL, BETWEEN A MAIN COMMUNICATION DEVICE AND ONE OR MORE PERIPHERAL COMMUNICATION DEVICES

TECHNICAL FIELD

The present invention relates to a wireless communication method, in particular via Bluetooth® protocol, between a main communication device and one or more peripheral communication devices.

In detail, the present invention relates to communication between a main communication device (e.g. a door lock or thermostat) to a broadcast network to which a peripheral connection device (e.g. a motion sensor) is connectable which, once a connection is established, can make the primary connection device perform an action or a detection of the current status or the like not expressly mentioned herein.

BACKGROUND ART

Bluetooth® technology is currently increasingly used, particularly in the Bluetooth® Low Energy (BLE) version, as its reduced power consumption allows its implementation on many battery-powered devices.

In particular, BLE meets the needs of a wide audience and is practically available on devices accessible to everyone (smartphones, tablets and PCs).

As is known, the Bluetooth® protocol (in particular BLE) operates in the 2.4 GHz frequency band and defines two types of Radio Frequency channels: "advertising" channels and data channels. The former are used to explore potential devices to connect and positioned in a certain area in order to realize a so-called broadcast transmission.

In BLE, when a main device only needs to transmit broadcast data, it transmits the data in "advertise" packets through the "advertising" channels. Any device that transmits "advertise" packets is called an "advertiser". The transmission of packets through the "advertising" channels takes place at time intervals called "advertising" events. Within an "advertising" event, the "advertiser" sequentially uses each "advertising" channel for the transmission of packets. Peripheral devices that receive data through "advertising" channels are called "scanners".

The bi-directional communication between the two devices is also referred to as a "stack" and goes through many "layers" or consecutive steps.

The first of these steps (initial step) firstly involves establishing a connection between the two devices. The subsequent "layers" will then allow an effective exchange of connection data carried out using the physical data channels for the exchange of information, for the control of actions on the main device, for the control of the status of the main device, etc.

The initial connection step between two devices is an asymmetrical procedure whereby the "advertiser" announces through the "advertising" channels that it is a connectable device, and also transmits its own access address (in FIG. 1 indicated as ADV_IND).

The peripheral device is in the listening state and receives the "advertiser" announcement signal. At that point, the peripheral device can transmit a connection request message (in FIG. 1 indicated as SCAN_REQ) to the "advertiser". The latter responds with a confirmation message (in FIG. 1 indicated as SCAN_RSP) so as to realize a point-to-point connection between the two devices.

The communication between the devices can therefore access the subsequent "layers" by using the physical data channels for the exchange of information, for the control of actions on the main device, for the control of the status of the main device, etc.

The above is functional, but often laborious, for reaching the control step of the actions on the main device, since it is necessary to wait until the end of the preliminary connection step between the devices before reaching the next step. For example, to open the lock of a door in Bluetooth®, it is necessary to wait for the connection, and perhaps in the meantime the user has already reached the door and is waiting.

OBJECTS OF THE PRESENT INVENTION

In this situation, the object of the present invention is to realize a wireless communication method, in particular via Bluetooth® protocol, between a main communication device and one or more peripheral communication devices, which allows speeding up the exchange of information for the interaction and coordination between the main device and one or more peripheral communication devices.

A further object of the present invention is to realize a bi-directional communication method that is simple to implement in Bluetooth® protocol and does not require elaborate software implementations.

Another object of the present invention is to realize a communication method that optimally utilizes batteries by requiring a minimum amount of energy for the transmission and reception of the response without requiring articulate communication work-flows.

Another object of the present invention is to create a communication method that guarantees data security in both directions from the initial connection step.

BRIEF DESCRIPTION OF THE FIGURES

Further characteristics and advantages of the present invention will more greatly emerge from the detailed description that follows of some preferred but not exclusive embodiments of a method and system for wireless communication, in particular via Bluetooth® protocol, between a main communication device and one or more peripheral communication devices illustrated in the appended drawings, in which.

DETAILED DESCRIPTION OF ONE OR MORE PREFERRED EMBODIMENTS

The wireless communication method, according to the present invention, is preferably via Bluetooth® protocol, and even more preferably via BLE (Bluetooth® Low Energy) protocol as indicated in the attached figures. However, the present invention could also be applied to other Bluetooth® protocols such as, for example, Bluetooth® 5 or even other wireless communication protocols.

Figure 5:
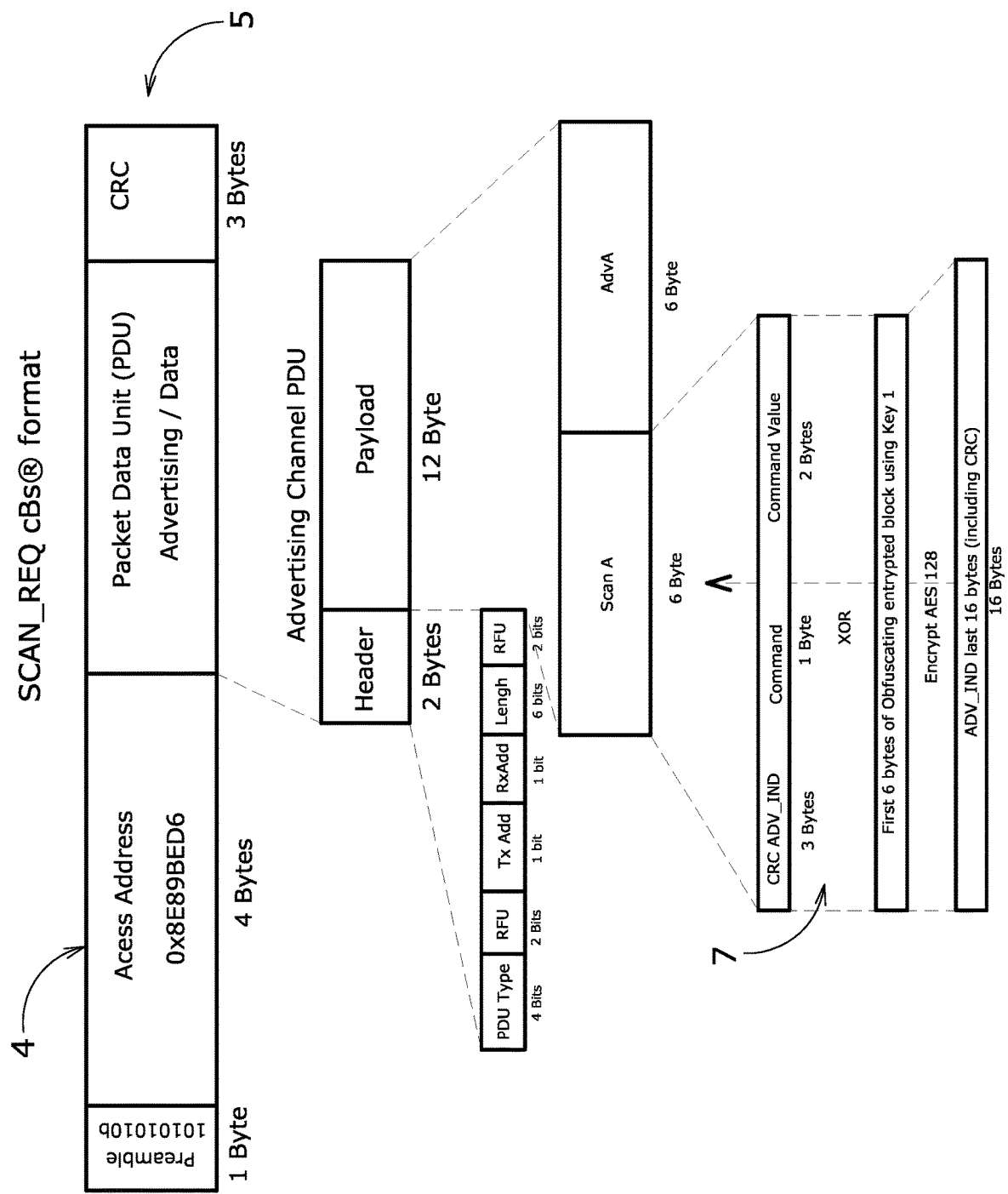
Figure 6:
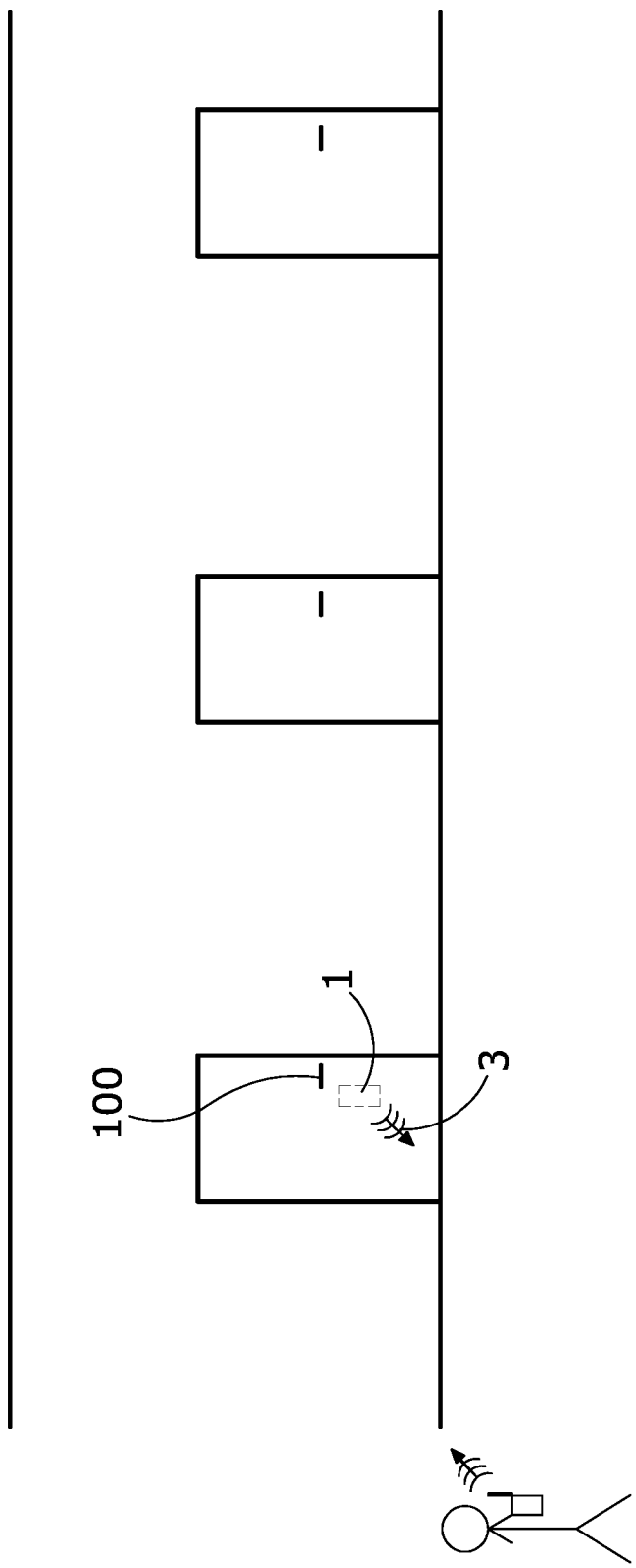
FIG. 6 shows an application example of the communication method and system according to the present invention.

The communication method takes place between one or more peripheral communication devices 1 (in the figures also referred to as "host A" or "advertiser") and a main communication device 2 or centralizer (in the figures also referred to as "Host B" or "scanner") which for example could be, respectively, a lock of a door or part thereof or a motion sensor, and a thermostat as shown in FIG. 5.

The main communication device could be defined as a "hub" according to the terminology used in domotics, while the peripheral devices could be defined as "broadcasters").

In particular, the method comprises an initial step of establishing a connection between the peripheral device 1 and the main device 2. This initial step corresponds to what is normally referred to as the initial "layer" of the communication "stack". They are followed by other "layers" not affected by the method according to the present invention.

Figure 1:
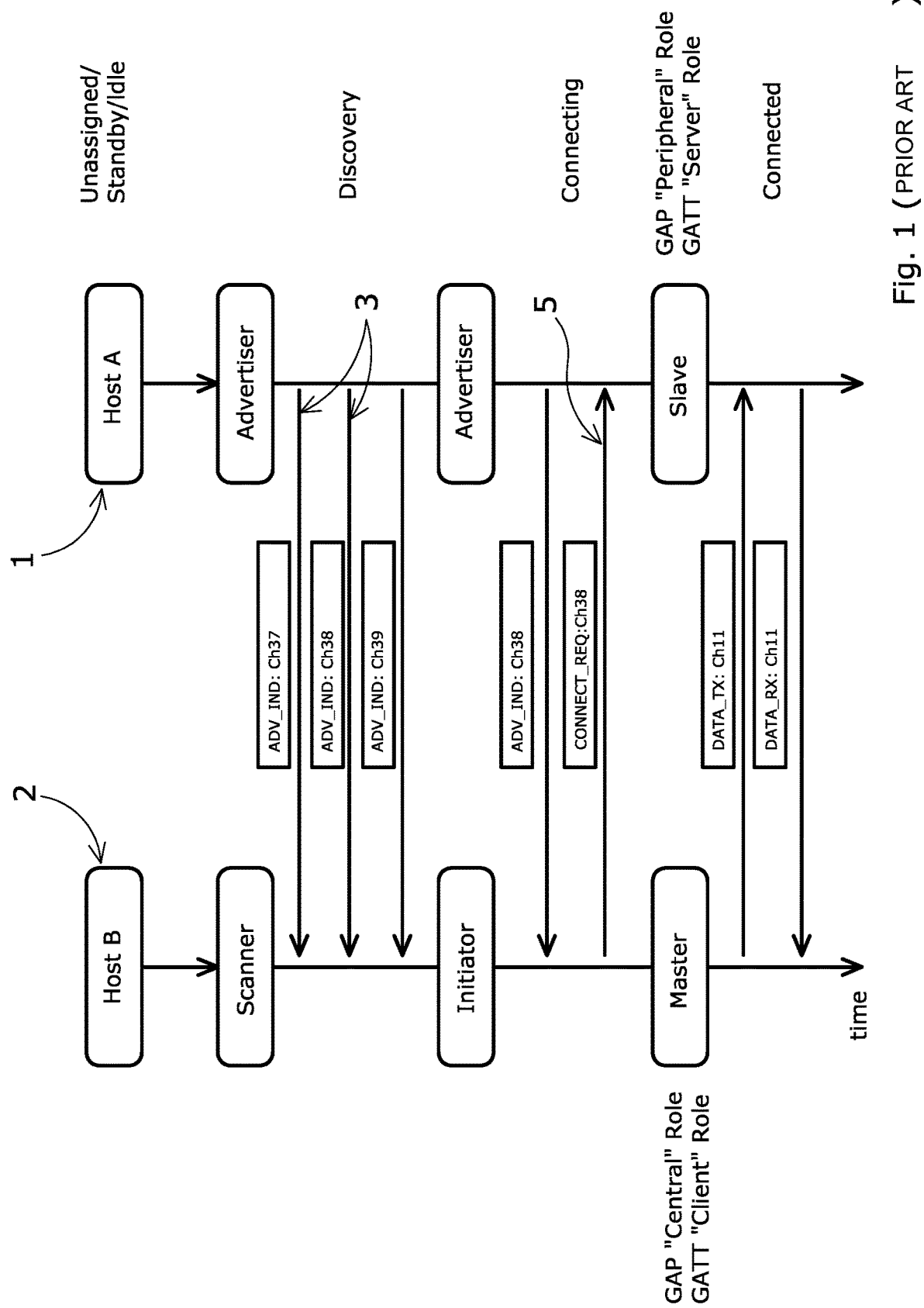
FIG. 1 shows the exchange of signals, through the various "layers", between the main communication device and the peripheral communication device, according to the known art.
Figure 2:
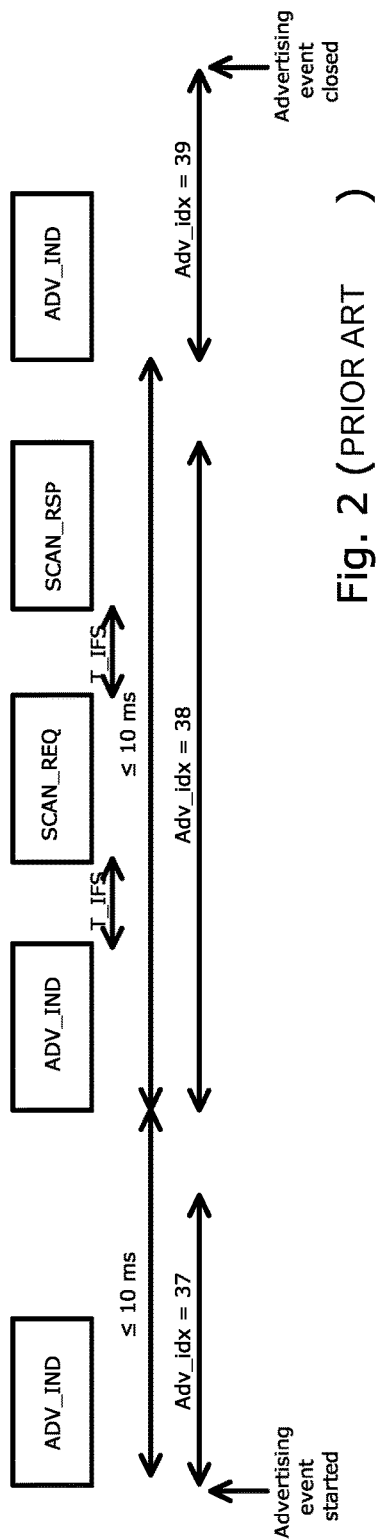
FIG. 2 shows the time intervals of signal exchange, through the various "layers", between the main communication device and the peripheral communication device, according to the known art.
Figure 3:
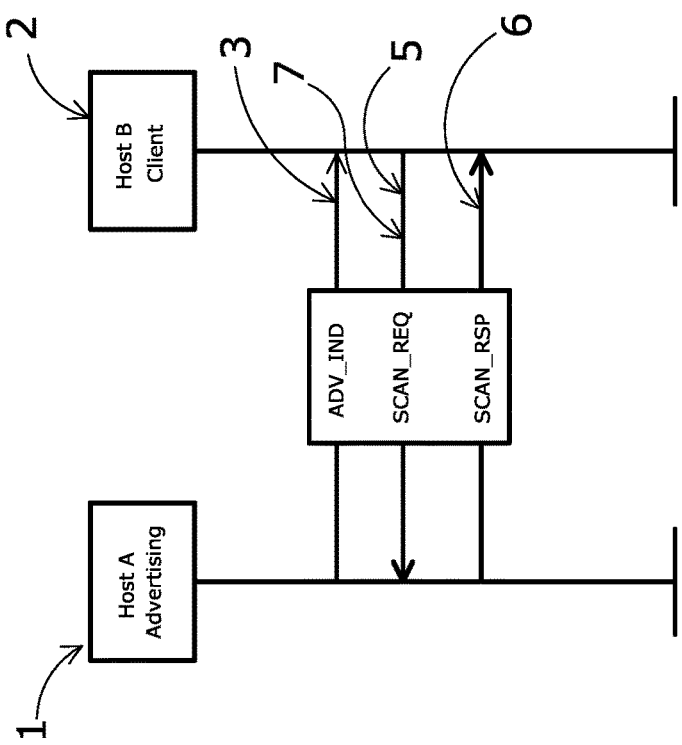
FIG. 3 shows the exchange of signals that takes place in the first "layer" according to the present invention.

For the sake of simplicity, only the initial connection step was shown in FIG. 3. It comprises the following sub-steps:
sending a first announcement signal 3 (ADV_IND or ADV_SCAN_IND) from the peripheral communication device 1 towards a broadcast network to which said main communication device 2 is connected, in which said announcement signal 3 contains data relating to a connection address (in FIG. 4 the connection address 4 occupies the "access address" part);
receiving said first announcement signal 3 from the main communication device 2. In essence, the main communication device 2 is in a "listening" state waiting to receive one or more announcement signals from some peripheral device 1;
sending a connection request signal 5 (SCAN REQ) from the main communication device 2 towards the peripheral communication device 1 through said connection address 4;
sending a connection confirmation signal 6 (SCAN RSP) from the peripheral communication device 1 towards the main communication device 2.

It should be noted that the communication described above could be a sort of "micro-communication" (micro-network) that is part of a broader and more complex communication system.

In particular, the communication system of the present invention can also be replicated for other levels (or layers) of communication which are side-by-side or hierarchically interfaced.

In accordance with the present invention, the step of sending said connection request signal 5 comprises a sub-step of inserting, in said connection request signal 5, additional data 7 representing a first action to be performed (e.g. switching on) and/or values and/or current status by the peripheral communication device 1 so as to advantageously be able to anticipate said first action to be performed and/or values and/or current status to a step prior to that of sending the confirmation signal 6.

In other words, said sub-step of insertion envisages forcing the standard communication protocol so as to define a reduced-step protocol (and not a procedure). Specifically, said first action to be performed (e.g. switching on) is performed in less than three steps of the initial step. In fact, by way of example, it can be noted that normally the standard communication protocol (Bluetooth®) envisages that at least many steps are performed to make the device 1 perform an action, while the present invention allows the action to be performed in only two steps.

In other words, the present invention defines a reduced step communication protocol so as to save memory and energy.

In particular, as better specified in FIG. 5, the step of inserting additional data 7 envisages occupying some of the bytes dedicated to the payload of the advertising protocol of the Bluetooth® protocol.

Specifically, the additional data 7 that are inserted according to the present invention, are at least 1 byte (preferably 3 bytes) of the "Scan A" field of the "Payload".

Figure 4:
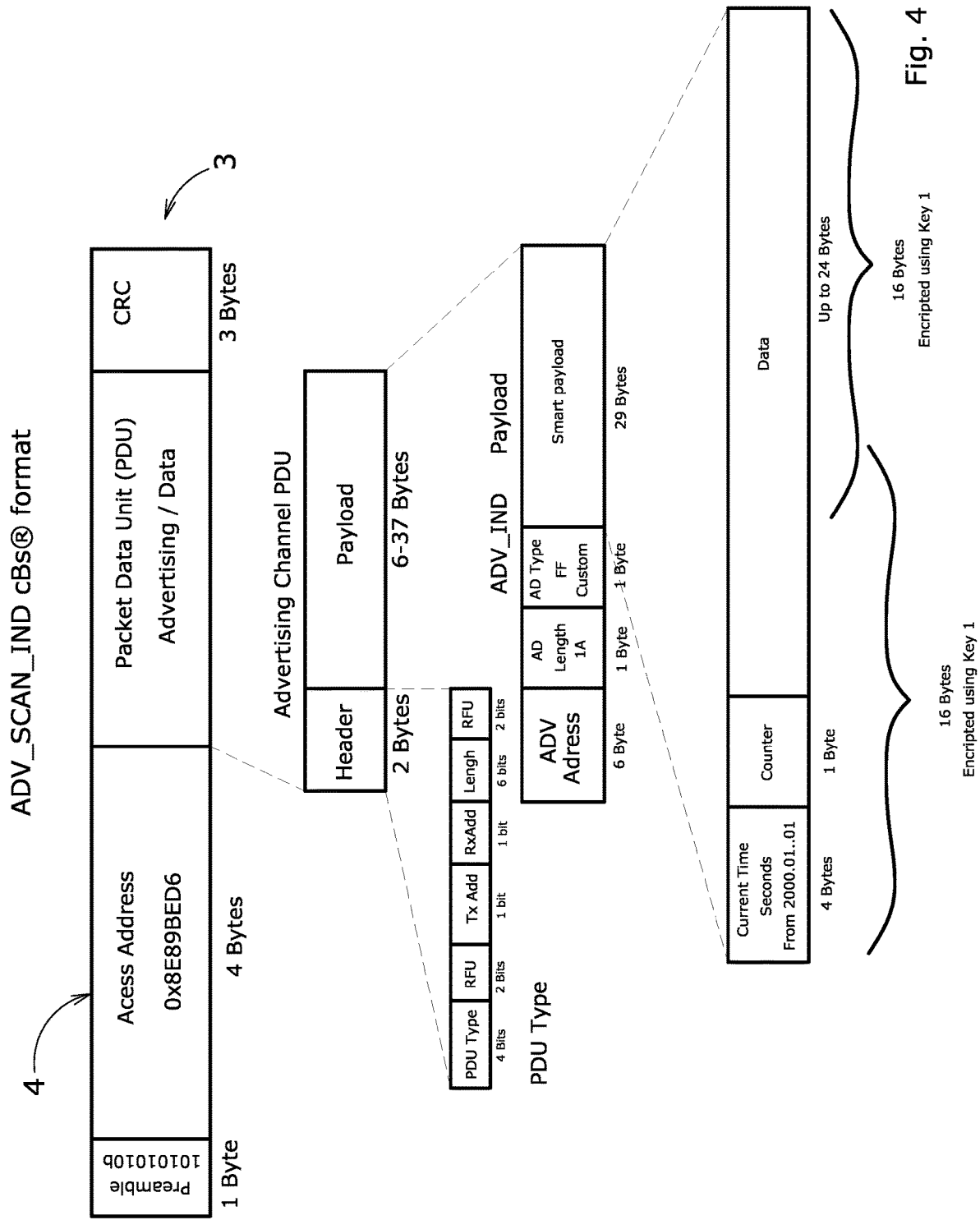
FIGS. 4 and 5 show in detail the data structure of the communication protocols for the signals ADV_SCAN (announcement signal) and SCAN_REQ (connection request signal)

In particular, the step of inserting additional data 7 envisages occupying one or more bits of the connection request signal 5 and modifying and/or deleting the data previously contained in said bits to be occupied. In detail, the "CRC ADV IND" field is used and entered in the "Payload", as illustrated in FIG. 4.

Advantageously, using the field assigned to the receiver to identify itself as a "ScanA" address allows obtaining the following advantages:
identifying having received the message in a unique manner using the field "CRC ADV IND" of the packet (varied from time to time to render it unique);
adding for the remaining bytes (there are at least 3) additional information or commands already in this first connection step;
encrypting all the data to authenticate that we really are the defined recipients and for confidentiality.

It should also be noted that the step of inserting additional data 7 envisages that they are encrypted according to an encryption key (e.g. Key 1 as indicated in FIG. 5). This encryption key is known to both the peripheral communication device 1 and the main communication device 2.

In particular, the method envisages encrypting the announcement signal 3, the connection request signal 5 and the confirmation signal 6 allowing the broadcast to be secured (usually it is not) and, preferably, allowing customizations and other connections to functions such as beacons and the like. For each signal and each sending, the encryption key can be the same or can be varied according to needs.

In other words, the encryption is bi-directional from the main communication device 2 to the peripheral communication device 1 and vice versa.

Advantageously, the encryption allows the identification and authentication of the transmitter within the network, as well as confidentiality and data security in order to realize two actions in a single step, streamlining and speeding up the protocol.

Preferably, the field "ADV_IND" is not encoded in the first announcement signal 3, so as to exploit all the advantages of BLE implementations. However, the "Smart payload" field in which the data is inserted is encoded.

In other words, the data transmitted in broadcast and contained in the "payload" are encrypted to safely identify the transmitter and protect its confidentiality.

Such additional data 7 already includes an action or the like that the peripheral communication device 1 can already perform without moving on to subsequent data exchange steps (subsequent "layers").

Advantageously, the present invention allows avoiding further information requests after the initial step or included in the connection confirmation signal 6 (SCAN RSP), since they are already included in the request signal 5 (SCAN REQ).

For example, in the case of FIG. 5 where the peripheral communication device 1 comprises a lock 100 of a door or a motion sensor and said main communication device 2 comprises a thermostat, the lock 100 or motion sensor could already be activated and unlocked at the moment when the connection request signal 5 is received by the main communication device 2, without accessing subsequent "layers".

Alternatively, the peripheral communication device 1 could comprise a room thermostat and said main communication device 2 could comprise a mobile telephone device (smartphone) or a thermostat.

An object of the present invention is also a wireless communication system, in particular via Bluetooth® protocol, which implements and descends directly from that which is laid out above in relation to the method which is hereinafter fully referred to.

Thus the system comprises:
the peripheral communication device 1;
one or more peripheral communication devices 1,
the peripheral communication device 1 is configured to send the first announcement signal 3 from the peripheral communication device 1 towards a broadcast network to which said main communication device 2 is connected during the initial step which envisages establishing a connection between the peripheral device 1 and the main device 2. the announcement signal 3 contains data relating to the connection address 4.

Furthermore, the main communication device 2 is configured to receive said first announcement signal 3 from the main communication device 2 and to send the connection request signal 5 towards the peripheral communication device 1 through said connection address 4. The peripheral communication device 1 is configured to send a connection confirmation signal 6 towards the main communication device 2.

According to the present invention, the main communication device 2 is configured to insert in said connection request signal 5 said additional data 7 relative to a first action to be performed and/or values and/or current status by the peripheral communication device 1.

In particular, the main communication device 2 is configured to insert in said connection request signal 5 the additional data 7 so as to occupy one or more bits of the connection request signal 5 and modify and/or delete the data previously contained in said bits to be occupied.

As already mentioned, the communication protocol between the peripheral communication device 1 and one or more peripheral communication devices 1 is of the Bluetooth® low energy type, but it could also be of another type not expressly mentioned herein.

Furthermore, the main communication device 2 is configured to insert in said connection request signal 5 the additional data 7 so as to occupy some of the bytes (preferably 3 bytes) dedicated to the "Scan A" field of the "Payload" of the "advertising protocol" of the Bluetooth® protocol.

Furthermore, the main communication device 2 is configured to encrypt said additional data 7 according to an encryption key known to the peripheral communication device 1 and the main communication device 2. For each signal and each sending, the encryption key can be the same or can be varied according to needs.

The present invention attains the set objects.

In practice, the method envisages using a change in use in the broadcast response field to implement a bi-directional communication function without switching to additional "layers" in the Bluetooth® protocol "stack".

In addition, the method and system are simple to realize and do not require a long protocol "Stack"

It should also be noted that the method and system according to the present invention are secure since they use an encryption system in both directions.

Furthermore, the implementation of the present invention does not require modifications to the usual "Stacks" but only to the content.

The additional data 7 inserted allows confirming the receipt and transporting 3 bytes, for example, of information included in the response.

Finally, it should be noted that the present invention can advantageously be implemented with little memory and with very limited energy consumption, favouring battery-powered IoT devices.

It should also be noted that the present invention proves to be easily realized and that the cost for implementation of the invention is not very high.

The invention claimed is:

1. A wireless communication method, in particular through Bluetooth® protocol, between a main communication device and one or more peripheral communication devices, comprising an initial step which envisages establishing a connection between the main device and the peripheral device; said initial step comprises the following sub-steps:
sending a first announcement signal from the peripheral communication device towards a broadcast network to which said main communication device is connected, wherein said announcement signal contains data relating to a connection address;
receiving said first announcement signal from the main communication device;
authenticating said peripheral communication device which has forwarded said first announcement signal;
sending a connection request signal from the main communication device towards the peripheral communication device through said connection address;
authenticating said main communication device that sent said request signal from the peripheral communication device;
sending a connection confirmation signal from the peripheral communication device towards the main communication device;
wherein said step of sending said connection request signal comprises a sub-step of inserting, in said connection request signal, additional data so as to be able to anticipate the inserting of said additional data a step prior to that of sending the confirmation signal, wherein the additional data represents at least one of (i) a first action to be performed, (ii) a value, and (iii) a current status of the peripheral communication device.

2. The method according to claim 1, wherein said sub-step of inserting, in said connection request signal, additional data is performed in less than three steps of the initial step.

3. The method according to claim 1, wherein said sub-step of insertion envisages forcing the standard communication protocol so as to define a reduced-step protocol.

4. The method according to claim 1, wherein the step of inserting additional data envisages occupying one or more bits of the connection request signal and performing at least one of (i) modifying the data previously contained in said bits to be occupied and (ii) deleting the data previously contained in said bits to be occupied.

5. The method according to claim 1, wherein the communication protocol between the peripheral communication device and one or more peripheral communication devices is of the Bluetooth® low-energy type.

6. The method according to claim 1, wherein the step of inserting additional data envisages to occupy some of the bytes are that dedicated to the "payload" of the "advertising protocol" of the Bluetooth® protocol.

7. The method according to claim 1, wherein that the step of inserting additional data envisages that 3 bytes are occupied.

8. The method according to claim 1, wherein the step of sending the first announcement signal from the peripheral communication device towards the main communication device envisages that at least part of the contents of said first announcement signal are encrypted using an encryption key known by the peripheral communication device and the main communication device; said step of authenticating said peripheral communication device being performed through said encryption key.

9. The method according to claim 1, wherein the step of sending a connection request signal from the main communication device towards the peripheral communication device envisages that at least part of the contents of said request signal are encrypted using an encryption key known by the peripheral communication device and the main communication device; said step of authenticating said main communication device being performed through said encryption key.

10. The method according to claim 1, wherein the step of sending the connection confirmation signal from the peripheral communication device towards the main communication device, envisages that at least part of the contents of said confirmation signal are encrypted using an encryption key known by the peripheral communication device and the main communication device.

11. A wireless communication system, in particular through Bluetooth® protocol, comprising:
a main communication device;
one or more peripheral communication devices,
wherein said peripheral communication device is configured to send a first announcement signal from the peripheral communication device towards a broadcast network to which said main communication device is connected during an initial step which envisages establishing a connection between the peripheral device and the main device; said announcement signal containing data related to a connection address;
said main communication device being configured to receive said first announcement signal from the peripheral communication device and to authenticate said peripheral communication device; said main communication device being configured to send a connection request signal towards the peripheral communication device through said connection address;
said peripheral communication device being configured to authenticate said main communication device that sent said request signal from the peripheral communication device, and to send a connection confirmation signal towards the main communication device;
wherein said main communication device is configured to insert in said connection request signal some additional data so as to be able to anticipate the inserting of said additional data a step prior to that of sending the confirmation signal, wherein the additional data represents at least one of (i) a first action to be performed, (ii) a value, and (iii) a current status of the peripheral communication device.

12. The system according to claim 11, wherein said main communication device is configured to insert, in said connection request signal, said additional data in less than three steps of the initial step.

13. The system according to claim 11, wherein said main communication device is configured to perform said insertion so as to force the standard communication protocol to define a reduced-step protocol.

14. The system according to claim 11, wherein said main communication device is configured to insert in said connection request signal some additional data so as to occupy one or more bits of the connection request signal, the main communication device being configured to execute at least one of (i) modifying the data previously contained in said bits to be occupied, and (ii) deleting the data previously contained in said bits to be occupied.

15. The system according to claim 11, wherein the communication protocol between the main communication device and one or more peripheral communication devices is of the Bluetooth® low-energy type.

16. The system according to claim 11, wherein said main communication device is configured to insert in said connection request signal some additional data so as to occupy some of the bytes dedicated to the "payload" of the "advertising protocol" of the Bluetooth® protocol.

17. The system according to claim 11, wherein said main communication device is configured to insert in said connection request signal some additional data so that 3 bytes are occupied.

18. The system according to claim 11, wherein said peripheral communication device is configured to encrypt the contents of said first announcement signal according to an encryption key known by the peripheral communication device and the main communication device in order to authenticate said peripheral communication device.

19. The system according to claim 11, wherein said main communication device is configured to encrypt the contents of said request signal according to an encryption key known by the peripheral communication device and the main communication device in order to authenticate said main communication device.

20. The system according to claim 11, wherein said main communication device is configured to encrypt the contents of said confirmation signal according to an encryption key known by the peripheral communication device and the main communication device.

21. The system according to claim 11, characterized in that the main communication device comprises a thermostat.

* * * * *